(12) United States Patent
Francois

(10) Patent No.: US 11,220,139 B2
(45) Date of Patent: Jan. 11, 2022

(54) AEROPLANE TIRE TREAD WEAR INDICATOR

(71) Applicant: COMPAGNIE GENERALE DES ETABLISSEMENTS MICHELIN, Clermont-Ferrand (FR)

(72) Inventor: Olivier Francois, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 334 days.

(21) Appl. No.: 16/471,408

(22) PCT Filed: Dec. 18, 2017

(86) PCT No.: PCT/FR2017/053641
§ 371 (c)(1),
(2) Date: Jun. 19, 2019

(87) PCT Pub. No.: WO2018/115674
PCT Pub. Date: Jun. 28, 2018

(65) Prior Publication Data
US 2019/0375494 A1 Dec. 12, 2019

(30) Foreign Application Priority Data
Dec. 20, 2016 (FR) ...................................... 16/62816

(51) Int. Cl.
B60C 11/24 (2006.01)
B60C 11/03 (2006.01)
B60C 11/04 (2006.01)

(52) U.S. Cl.
CPC ............ *B60C 11/24* (2013.01); *B60C 11/032* (2013.01); *B60C 11/04* (2013.01); *B60C 2200/02* (2013.01)

(58) Field of Classification Search
CPC ...... B60C 11/24; B60C 11/246; B60C 11/243
See application file for complete search history.

(56) References Cited

U.S. PATENT DOCUMENTS 9,355,346 B2   5/2016  Butz
2005/0081971 A1  4/2005  Heinen
(Continued)

FOREIGN PATENT DOCUMENTS

CN   204586376 U   8/2015
EP   0 250 113      12/1987
(Continued)

Primary Examiner — Katelyn W Smith
Assistant Examiner — Nicholas J Weiler
(74) Attorney, Agent, or Firm — Cozen O'Connor

(57) ABSTRACT

Airplane tire with a tread wear indicator, with a circumferential ridge (4) of the tread (2) having an initial height H0 and an allowable remaining height HR. Wear indicator (6) comprises N cylindrical cavities (7) emerging on rolling surface (3) and independent of one another. The N cavities are divided into a first family of N1 wear cavities $C1_i$ (8) having respective initial depths $P1_i$ in pairs that are distinct and equal to $i*(H0-HR)/N1$, i being an integer number varying from 1 to N1, and into a second family of N2 positioning cavities $C2_j$ (9), j being an integer number varying from 1 to N2, each positioning cavity $C2_j$ having an initial depth $P2_j$ strictly greater than (H0−HR), such that only the N2 positioning cavities $C2_j$ (9) emerge on rolling surface (3) when height HR of circumferential ridge (4) is reached.

6 Claims, 4 Drawing Sheets

(56) References Cited

U.S. PATENT DOCUMENTS

| | | | |
|---|---|---|---|
| 2006/0124214 A1 | 6/2006 | Bauchot | |
| 2006/0213594 A1* | 9/2006 | Kemp | B60C 11/24 |
| | | | 152/154.2 |
| 2014/0130948 A1* | 5/2014 | Paturle | B60C 11/24 |
| | | | 152/154.2 |
| 2016/0221400 A1* | 8/2016 | Schimmoeller | B60C 11/24 |
| 2017/0282652 A1* | 10/2017 | Haan | B60C 11/24 |
| 2021/0129596 A1* | 5/2021 | Francois | G06K 9/00671 |

FOREIGN PATENT DOCUMENTS

| | | |
|---|---|---|
| EP | 1 524 131 | 4/2005 |
| EP | 1 705 034 | 9/2006 |
| FR | 1 480 472 | 5/1967 |
| FR | 2 917 668 | 12/2008 |
| JP | 2006-232152 | 9/2006 |
| WO | WO 2010/012735 | 2/2010 |

\* cited by examiner

AEROPLANE TIRE TREAD WEAR INDICATOR

RELATED APPLICATIONS

This is a U.S. National Phase Application under 35 USC 371 of International Application PCT/FR2017/053641 filed on Dec. 18, 2017.

This application claims the priority of French application no. 1662816 filed Dec. 20, 2016, the entire content of which is hereby incorporated by reference.

FIELD OF THE INVENTION

The subject of the present invention is a tire for an aeroplane, more particularly the tread thereof and, even more particularly, a tread wear indicator.

BACKGROUND OF THE INVENTION

It is known that the tread of a tire, intended to come into contact with the ground via a rolling surface, is the wearing part of the tire, that is to say that it undergoes a reduction of thickness resulting from the rolling of the tire. The tread is generally composed of elements in relief separated from one another by hollows, this combination constituting what is commonly called a sculpture. In the case of a tire for aircraft, the elements in relief are more often than not circumferential ridges, continuous over all the circumference of the tire and separated from one another by hollows called circumferential grooves. The wear causes the height of the circumferential ridges and, correlatively, the depth of the circumferential grooves to be reduced, thus degrading the performance of the tire. The wear of a circumferential ridge, at a given instant in the life of the tire, is generally quantified by a wear ratio. The wear ratio is equal to the ratio $(H_o-H)/H_o$, where $H_o$ and $H$ are, respectively, the initial height $H_o$ of the circumferential ridge, measured on the new tire, and the remaining height $H$ of the circumferential ridge, measured on the worn tire.

Regarding the specific field of tires for an aeroplane, the person skilled in the art has highlighted two types of wear depending on the phase of use of the tire. On landing, the median part of the tread, whose axial width is at least equal to 50% and at most equal to 80% of the total axial width of the tread, is subjected, when the rolling surface enters into contact with the ground, to a wear called "touchdown wear", resulting from a significant abrasion and from a high thermal heating, because of the speed differential between the speed of rotation of the tire and the speed of the aeroplane. In taxying phase, before the aeroplane has taken off or after it has landed, the lateral parts of the tread, positioned axially on either side of the median part and whose respective axial widths are at least equal to 10% and at most equal to 25% of the total axial width of the tread, are subject to a wear called "taxi wear", resulting from the braking forces exerted on these lateral parts because of their speed of rotation, which is greater than that of the median part. Thus, the tread is mainly worn, in its median part, on landing, and, in its lateral parts, in taxi phase.

The wear described previously often leads to the presence of a non-uniform wear of the tread, called uneven wear, resulting from the stresses during the different phases of use of the tire: take-off, taxying and landing. More particularly, a differential wear of the tread between the median part and the two lateral parts of the tread has been revealed, the wear of this median part being generally greater. The differential wear of the median part of the tread leads to a limitation on the life of the tire, therefore on its use and to its early removal, even though the tread generally exhibits only a relatively low wear of the lateral parts of the tread: which is disadvantageous economically.

In practice, a tire for an aeroplane is removed when the wear ratio of one or more circumferential ridges of the tread reaches a maximum acceptable value, generally benchmarked as base 100, and the worn tire is then replaced.

One difficulty known to any operator of tires for aeroplanes is how to predict, reliably, the replacement of the worn tires and schedule the corresponding maintenance operations. A poor scheduling of the maintenance operations can in fact cause untimely downtimes of the aeroplane inducing additional operating costs for the user. To avoid these downtimes, a storage of replacement tires is often implemented, on each of the airports frequented by the aeroplane fleet operator, to be able to perform tire replacements, at any moment, which is disadvantageous economically.

The scheduling of the tire replacement operations is complex, because, in particular, of the difficulty in predicting of the wear a tire for an aeroplane. In effect, the remaining thickness of the tread as a function of the number of landings performed, which characterizes the speed of wear of the tread and more specifically the speed of touchdown wear, does not vary linearly. The remaining wear potential, measuring the remaining number of landings that can be performed before complete wear, cannot be determined by a simple measurement of the remaining height of the circumferential ridges of the tread. By way of example, the inventors have been able, in a particular case, to show that a tread, theoretically allowing 400 landings to be performed before complete wear, corresponding to a wear ratio of 100%, in reality allows 160 landings to be performed, corresponding to 40% of the total forecast number of landings, with a wear ratio of 75%. In other words, the trend of the wear ratio as a function of the number of landings is not linear.

In practice, the respectively initial $H_o$ and remaining $H$ heights of a circumferential ridge are often determined by a direct measurement of the corresponding depth of the adjacent circumferential groove, using a suitable measurement tool, which presents the drawback of giving a certain tediousness to the tracking of the wear.

The wear ratio of the tread can also be determined using wear indicators, also called wear tell-tales. Conventionally, these wear indicators can be of two types: wear indicators in relief relative to a circumferential groove bottom and wear indicators positioning in the thickness of the circumferential ridges.

A wear indicator, composed of an element in relief relative to a circumferential groove bottom, generally has a height substantially lower than the initial height of the circumferential ridge. When the remaining height of the circumferential ridge, adjacent to the groove comprising the wear indicator, reaches an allowable minimum value, corresponding to the top level of the wear indicator, the allowable maximum wear ratio is reached and triggers the replacement of the tire. Such a wear indicator does not however make it possible to quantify the progressive trend of the wear of the tread during use: it simply indicates that the allowable maximum wear ratio is reached.

It has also been proposed to position wear indicators in the thickness of the circumferential ridges, such that the trace of these wear indicators on rolling surface can visually warn that the allowable minimum height of the circumferential ridges, defining the allowable maximum wear ratio of the circumferential ridge, was reached.

A first type of wear indicator positioned in the circumferential ridges is composed of rubbery elements, the rubbery composition of which is of non-black colour. As an example, the document FR 1480472 provides a tread incorporating coloured materials, contrasting with the black colour of the tire, which appear when the allowable wear limit has been reached. The use of coloured rubbery compositions does however have a certain number of drawbacks, particularly in terms of the complexity and of the cost of the manufacturing method. Accurately positioning them in the tread is also difficult to ensure. Furthermore inserts of coloured rubbery compositions can constitute irregular areas of wear. Finally, this type of wear indicator does not make it possible to quantify the progressive trend of the wear of the tread during use.

A second type of wear indicator positioned in the circumferential ridges is composed of grooves or cavities hollowed out in the circumferential ridges, or, more generally, in the relief elements of the tread. The trace of these wear indicators on the rolling surface is characterized by an optical contrast between the rubbery composition forming the tread and the grooves or cavities formed in this same tread.

To illustrate a first example of this second type of wear indicator, the document EP 0250113A2 describes wear indicators, composed of groups of grooves of different depths, such that the traces of the grooves on the rolling surface disappear at different wear ratios. The visual detection of these grooves can however be difficult because of the small thickness of these grooves and the absence of contrast between the grooves and the rest of the tread.

As an illustration of a second example of the second type of wear indicator, the documents EP 1705034B1 and WO 2010012735A1 describe a tread comprising a rolling surface and at least one wear indicator formed by at least one cavity emerging on the rolling surface, the trace of the cavity on the rolling surface comprising a bearing surface and a plurality of parts connected to a bearing surface and protruding on the bearing surface, the number of the protruding parts being a function of the wear ratio of the tread, the geometrical form and the area of the trace of the cavity on the rolling surface being modified as a function of the wear ratio of the tread, the geometrical form of said trace being an analogous expression of the wear ratio of the tread. "Analogous expression" of the wear ratio of the tread should be understood to mean a form of the trace of the wear indicator that makes it possible to express the wear ratio by itself and directly, without it being necessary to introduce another reference. The forms of these wear indicators are relatively complex and, assuming that these wear indicators are manufactured by moulding, in the baking of the tire, the corresponding moulding elements are consequently relatively complex.

Finally, according to a third example of the second type of wear indicator, the document U.S. Pat. No. 9,355,346B2 describes a tread wear indicator whose appearance changes as a function of the wear. The wear indicator thus contains a multidimensional pattern, arranged in the tread, such that different levels of the pattern are exposed as a function of the wear. As in the preceding example, the complexity of form of such a multidimensional pattern implies relative manufacturing complexity.

The inventors set out to determine the wear ratio of a tread of a tire for an aeroplane, using wear indicators positioned in the circumferential ridges of the tread, said wear indicators being simple to manufacture and allowing for a direct and reliable reading of the wear ratio, over the life of the tire.

SUMMARY OF THE INVENTION

One aspect of the present invention is directed to a tire for an aeroplane comprising a tread, intended to come into contact with the ground via a rolling surface:

the tread comprising at least three circumferential ridges axially separated from one another by at least one circumferential groove, at least one circumferential ridge having an initial height H0, measured on the tire in the new state, and being intended to be worn to an allowable remaining height HR, the at least one circumferential ridge comprising at least one wear indicator, the wear indicator comprising N cylindrical cavities emerging on the rolling surface and independent of one another, the N cavities of the wear indicator being divided up into a first family of N1 wear cavities $C1_i$ having respective initial depths $P1_i$ in pairs that are distinct and equal to $i*(H0-HR)/N1$, i being an integer number varying from 1 to N1, and into a second family of N2 positioning cavities $C2_j$, j being an integer number varying from 1 to N2, each positioning cavity $C2_j$ having an initial depth $P2_j$ strictly greater than (H0−HR), such that only the N2 positioning cavities $C2_j$ emerge on the rolling surface when the allowable remaining height HR of the circumferential ridge is reached.

The wear indicator of a circumferential ridge of the tread of a tire for an aeroplane, according to the invention, is composed of N cylindrical cavities emerging on the rolling surface, that are divided up, essentially, into two distinct families respectively of N1 wear cavities and of N2 positioning cavities.

The first family, composed of N1 wear cavities $C1_i$, i being an integer number varying from 1 to N1, is intended to quantify the wear ratio of the circumferential ridge at any instant in the life of the tire. Each wear cavity $C1_i$ is a cylinder of radial axis, at right angles to the axis of revolution of the tire, emerging on the rolling surface and having a depth $P1_i$ equal to $i*(H0-H)/N1$. Consequently, a wear cavity $C1_i$ is visible on the rolling surface, as long as the height of the circumferential ridge lies between its initial value H0 and a remaining value $H_i$ equal to $H0-(i*(H0-HR)/N1)$, and disappears below this remaining value $H_i$. The corresponding wear ratio $U_i=(H0-H_i)/H0$ is then equal to $i*(1-HR/H0)/N1$. When i is equal to N1, the remaining height $H_{N1}$ of the circumferential ridge is then equal to HR, a minimum remaining height that is allowable with respect to the wear, corresponding to an allowable maximum wear ratio equal to 1−HR/H0. There is thus a gradual disappearance of the wear cavities $C1_i$, when i varies from 1 to N1.

The second family, composed of N2 positioning cavities $C2_j$, j being an integer number varying from 1 to N2, is intended to mark the axial positioning of the wear indicator, that is to say its positioning in the axial width of the tread, the axial direction being, by convention, parallel to the axis of revolution of the tire. Each positioning cavity $C2_j$ is a cylinder of radial axis, at right angles to the axis of revolution of the tire, emerging on the rolling surface and having a depth $P2_j$ strictly greater than (H0−HR), so as to remain emerging, therefore visible, when the allowable minimum remaining height HR of the circumferential ridge is reached, that is to say when the N1 wear cavities $C1_i$ of the first family have disappeared. In the general case, there is no particular relationship between the respective depths $P2_j$ of the positioning cavities $C2_j$, but the latter are advantageously equal to one another to simplify the manufacturing of said positioning cavities by moulding.

Advantageously, the number N1 of wear cavities $C1_i$ is at least equal to 1 and at most equal to 10. The higher the number N1, the greater the number of intermediate wear ratios between the new tire, corresponding to a zero wear ratio, and the totally worn tire, corresponding to a maximum wear ratio equal to 1−H0/HR, that can be determined. The number N1 thus conditions the resolution of the tracking of the trend of the wear ratio of the circumferential ridge, over the life of the tire.

Advantageously too, the number N2 of positioning cavities $C2_j$ is at least equal to 1 and at most equal to 5. The number N2 must be sufficiently high to make it possible to identify the wear indicator in a differentiated way depending on whether it is positioned in a circumferential ridge of the median portion of the tread, also called median circumferential ridge, or in a circumferential ridge of a shoulder portion of the tread, also called shoulder circumferential ridge.

Preferentially, any cavity has, on the rolling surface, an emerging surface inscribed in a circle of diameter D at least equal to 2 mm and at most equal to 10 mm. Below 2 mm, the emerging surface of the cavity has an insufficient diameter that does not allow for easy visual detection and, as appropriate, that can be sensitive to blocking by foreign materials. Beyond 10 mm, the emerging surface can have a local impact on the wear of the circumferential ridge.

According to a preferential embodiment of the wear cavities, all the wear cavities $C1_i$ have, on the rolling surface, an emerging surface inscribed in a circle of identical diameter D1. An identical emerging surface diameter makes it possible to easily identify that the wear cavities belong to the same first family and to have, for the manufacturing, moulding parts of the same section, hence a gain in standardization.

According to a preferential embodiment of the positioning cavities, all the positioning cavities $C2_j$ have, on the rolling surface, an emerging surface inscribed in a circle of identical diameter D2. An identical emerging surface diameter makes it possible to easily identify that the positioning cavities belong to the same second family and to have, for the manufacturing, moulding parts of the same section, hence a gain in standardization.

Advantageously, the respective diameters of the wear and positioning cavities, identical within one and the same family, are distinct from one family to another. This difference makes it possible to easily distinguish whether a given cavity belongs to one or other of the two families.

Preferentially, the tread comprises two shoulder circumferential ridges and one median circumferential ridge, each comprising at least one wear indicator having the same number N1 of wear cavities $C1_i$ and a different number N2 of positioning cavities $C2_j$, such that the total number N=N1+N2 of cavities is different for each of the two shoulder circumferential ridges and the median circumferential ridge. A number N2 of positioning cavities $C2_j$ that is different according to the circumferential ridge concerned makes it possible to clearly identify that the wear indicator belongs to a given circumferential ridge and therefore the area of the tread in which the wear is measured.

Even more preferentially, the tread comprises two shoulder circumferential ridges and one median circumferential ridge, each comprising at least three wear indicators, distributed over the circumference of the circumferential ridge, identical to one another for each circumferential ridge, and having, from one circumferential ridge to the other, the same number N1 of wear cavities $C1_i$ and a different number N2 of positioning cavities $C2_j$. Advantageously, each circumferential ridge for which the wear ratio is to be determined over time comprises at least three wear indicators, distributed over the circumference of the tire, preferably with an equidistant distribution. This distribution of at least three wear indicators for a given circumferential ridge makes it possible to determine the local wear ratios of said circumferential ridge at various points of the circumference of the tire, and therefore identify any uneven wears on the circumference, and also to determine a mean wear ratio, corresponding to the average of the local wear ratios recorded. Moreover, as previously, a number N2 of positioning cavities, different according to the circumferential ridge concerned, makes it possible to clearly identify that the wear indicator belongs to a given circumferential ridge and therefore the area of the tread in which the wear is measured.

It is also advantageous for the respective at least one wear indicator of the two shoulder circumferential ridges and of the median circumferential ridge to be positioned circumferentially relative to one another in a circumferential angular sector at most equal to 20°. In effect, the fact that there are wear indicators for the various circumferential ridges grouped together in a limited angular sector facilitates the capture of the visual information concerning these wear indicators.

BRIEF DESCRIPTION OF THE DRAWINGS

The features of the invention will be better understood from FIGS. 1 to 6, not represented to scale.

DETAILED DESCRIPTION OF THE DRAWINGS

Figure 1:
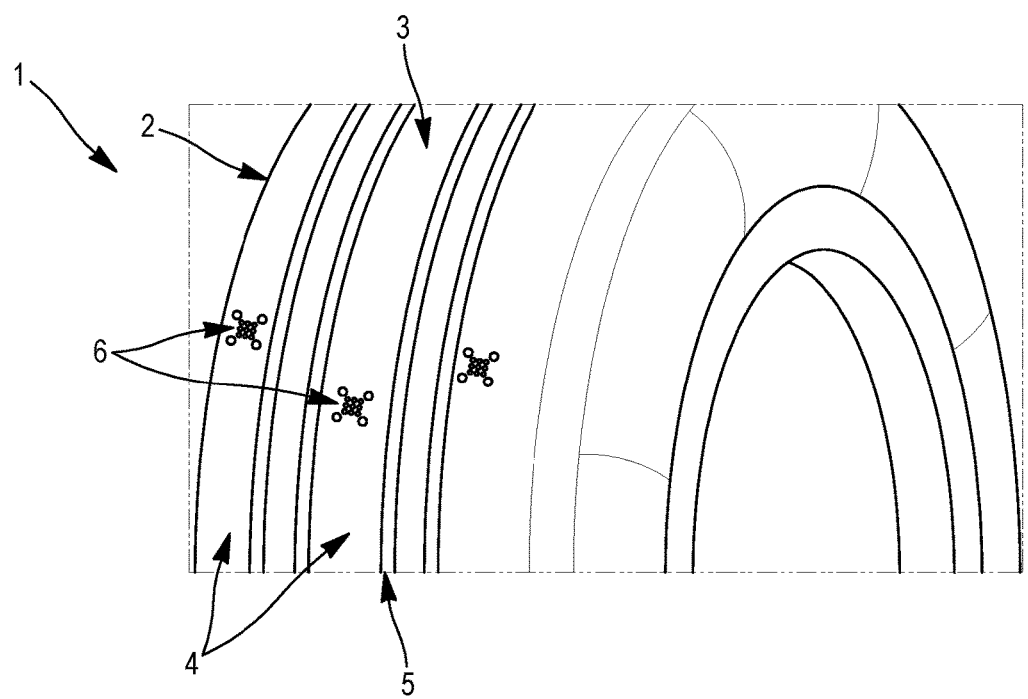
FIG. 1: partial perspective view of a tire according to an embodiment of the inventions.

FIG. 1 represents a partial perspective view of a tire 1 for an aeroplane, comprising a tread 2, intended to come into contact with the ground via a rolling surface 3. The tread 2 comprises five circumferential ridges 4 and four circumferential grooves 5 separating the circumferential ridges in pairs. Two shoulder circumferential ridges, axially the outermost, and the median circumferential ridge each comprise a wear indicator 6 comprising cylindrical cavities emerging on the rolling surface 3 and independent of one another.

Figure 2:
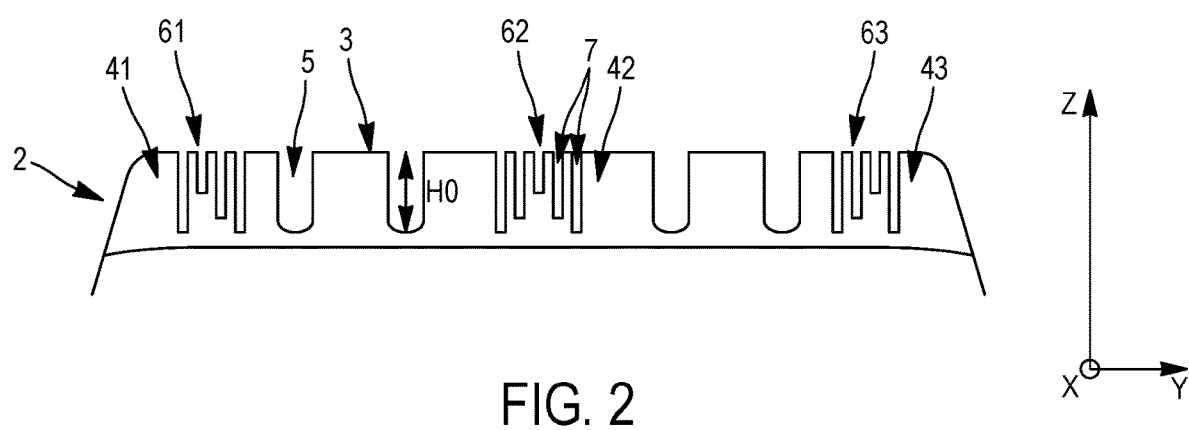
FIG. 2: meridian cross section of the tread of a tire according to an embodiment of the inventions.

FIG. 2 represents a meridian cross section of a tread of a tire according to the invention. The tread 2 comprises five circumferential ridges, including two shoulder circumferential ridges (41, 43) and a median circumferential ridge 42, each comprising a wear indicator (61, 62, 63). Each wear indicator (61, 62, 63) comprises cylindrical cavities 7 emerging on the rolling surface 3 and independent of one another. Each circumferential ridge (41, 42, 43) has an initial height H0, measured on the tire in the new state, and is intended to be worn to an allowable remaining height HR (not represented).

Figure 3:
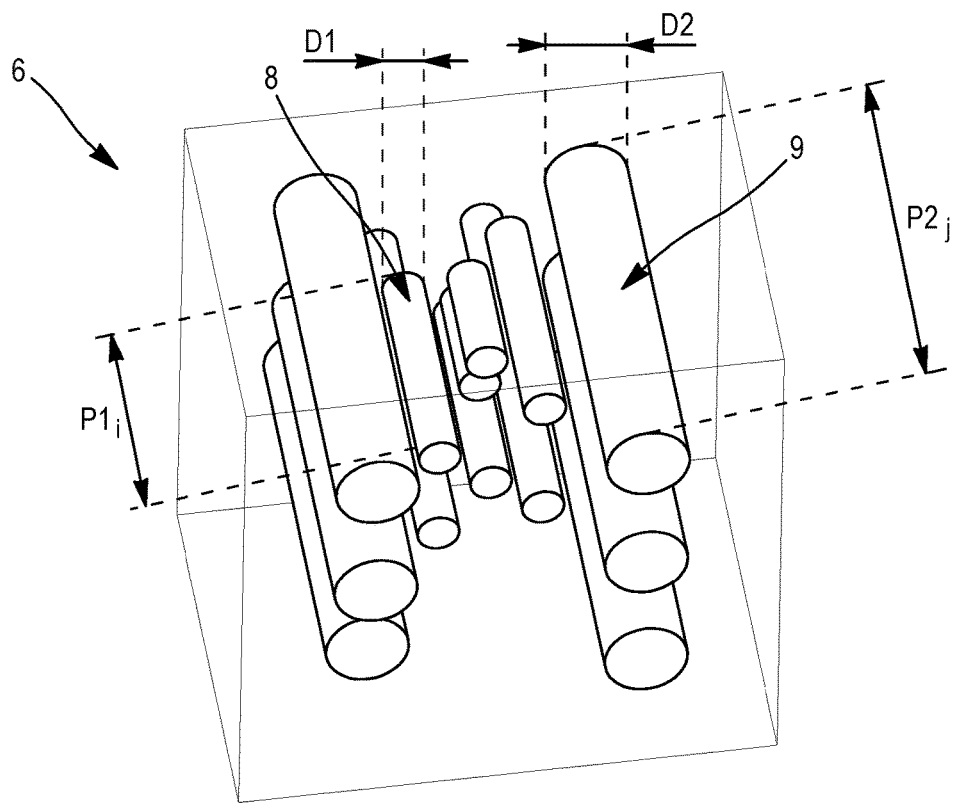
FIG. 3: perspective view of a wear indicator according to an embodiment of the inventions.

FIG. 3 shows a perspective view of a wear indicator according to the invention. The wear indicator 6 comprises a first family of wear cavities 8, intended to quantify the wear ratio of the circumferential ridge at any instant in the life of the tire, each wear cavity 8 being a cylinder of depth $P1_i$ having an emerging surface inscribed in a circle of diameter D1. The wear indicator 6 comprises a second family of positioning cavities 9, intended to mark the axial positioning of the wear indicator, that is to say its positioning in the axial width of the tread, each wear cavity 9 being a cylinder of depth $P2_j$ having an emerging surface inscribed in a circle of diameter D2.

Figure 4:
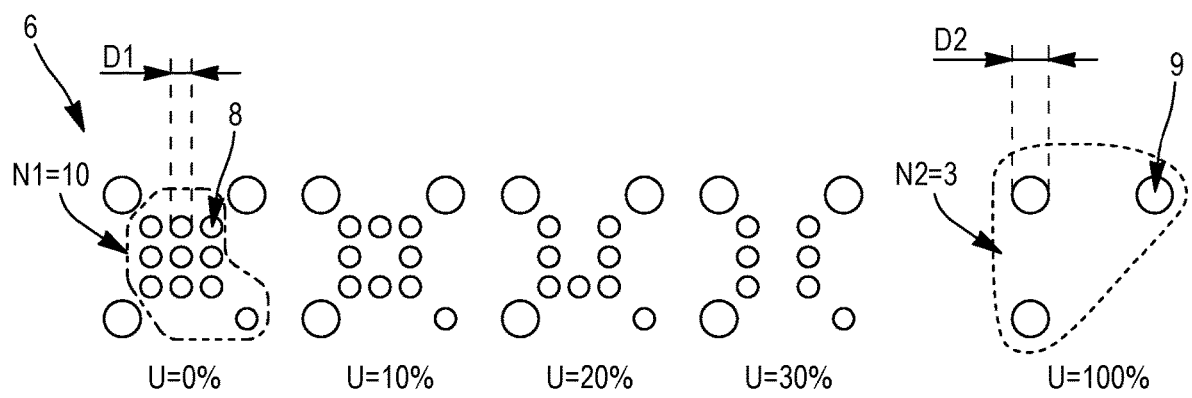
FIG. 4: plan view of a wear indicator according to an embodiment of the invention, with different wear ratios.

FIG. 4 represents a plan view of a wear indicator according to the invention, with different wear ratios. The wear indicator 6 comprises a first family of N1=10 wear cavities 8 having an emerging surface inscribed in a circle of diameter D1 and a second family of N2=3 positioning cavities 9 having an emerging surface inscribed in a circle of diameter D2. The wear indicator is represented with various wear ratios. As seen previously, the wear ratio is, by definition, equal to U=1−H0/H, H0 being the initial height of the circumferential ridge, on a new tire, and H being the height of the circumferential ridge, on a tire which is at least partially worn. On the new tire, the wear ratio U is therefore equal to 0%. On the completely worn tire, the wear ratio U is equal to 1−H0/HR, HR being the allowable remaining height: by convention, this maximum wear ratio is taken to be equal to 100%. A wear ratio equal to 10% corresponds to a circumferential ridge height equal to H=H0−0.1*(H0−HR) and, more generally, a wear ratio equal to i % corresponds to a circumferential ridge height equal to H=H0−(i/100)*(H0−HR). For a zero wear ratio, the wear indicator 6 comprises ten wear cavities 8 and three positioning cavities 9. For a wear ratio equal to 10%, a first wear cavity $C1_1$, having a depth $P1_1$ equal to 0.1*(H0−HR), has been completely worn and is no longer visible on the rolling surface: the wear indicator 6 then comprises nine wear cavities 8 and three positioning cavities 9. For a wear ratio equal to 20%, a second wear cavity $C1_2$, having a depth $P1_2$ equal to 0.2*(H0−HR), has been completely worn and is no longer visible on the rolling surface: the wear indicator 6 then comprises eight wear cavities 8 and three positioning cavities 9. For a wear ratio equal to 30%, a third wear cavity $C1_3$, having a depth $P1_3$ equal to 0.3*(H0−HR), has been completely worn and is no longer visible on the rolling surface: the wear indicator 6 then comprises seven wear cavities 8 and three positioning cavities 9. Finally, for a wear ratio equal to 100%, all the wear cavities 8 of the wear indicator 6 have been completely worn: only the three positioning cavities 9 are visible, the respective depths of which $P2_j$, j varying from 1 to 3, are strictly greater than H0−HR.

Figure 5A:
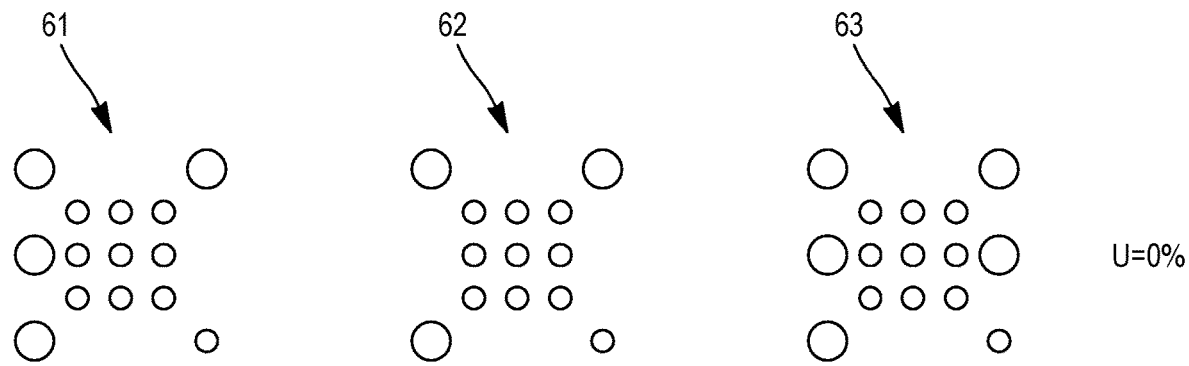
FIG. 5A: plan view of 3 wear indicators, positioned respectively on a median circumferential ridge and two shoulder circumferential ridges, for a tire in the new states.

FIG. 5A represents, for a new tire with zero wear ratio, three wear indicators (61, 62, 63) respectively positioned in the median circumferential ridge 42 and the shoulder circumferential ridges (41, 43), said circumferential ridges not being represented in FIG. 5A. The wear indicator 61 of a first shoulder circumferential ridge comprises N1=10 wear cavities and N2=4 positioning cavities. The wear indicator 62 of a median circumferential ridge comprises N1=10 wear cavities and N2=3 positioning cavities. The wear indicator 63 of a second shoulder circumferential ridge comprises N1=10 wear cavities and N2=5 positioning cavities. The three wear indicators (61, 62, 63) have the same number N1 of wear cavities and different numbers N2 of positioning cavities, making it possible to differentiate them from one another and to identify that they belong to a given circumferential ridge.

Figure 5B:
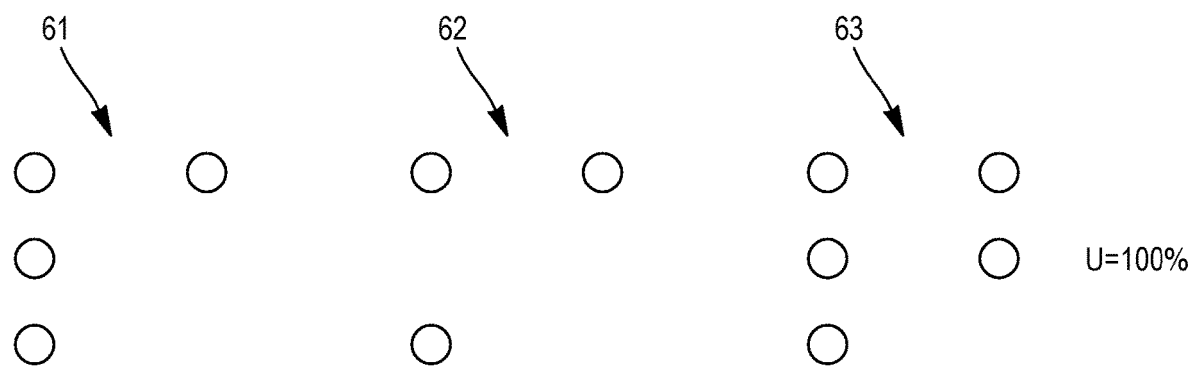
FIG. 5B: plan view of 3 wear indicators, positioned respectively on a median circumferential ridge and two shoulder circumferential ridges, for a totally worn tire

Similarly, FIG. 5B represents, for a totally worn tire with a wear ratio equal to 100%, three wear indicators (61, 62, 63) respectively positioned in the median circumferential ridge 42 and the shoulder circumferential ridges (41, 43), said circumferential ridges not being represented in FIG. 5B. Only the N2 respective positioning cavities of each of the three wear indicators are visible, with N2=4 for the first shoulder circumferential ridge, N2=3 for the median circumferential ridge and N2=5 for the second shoulder circumferential ridge.

Figure 6:
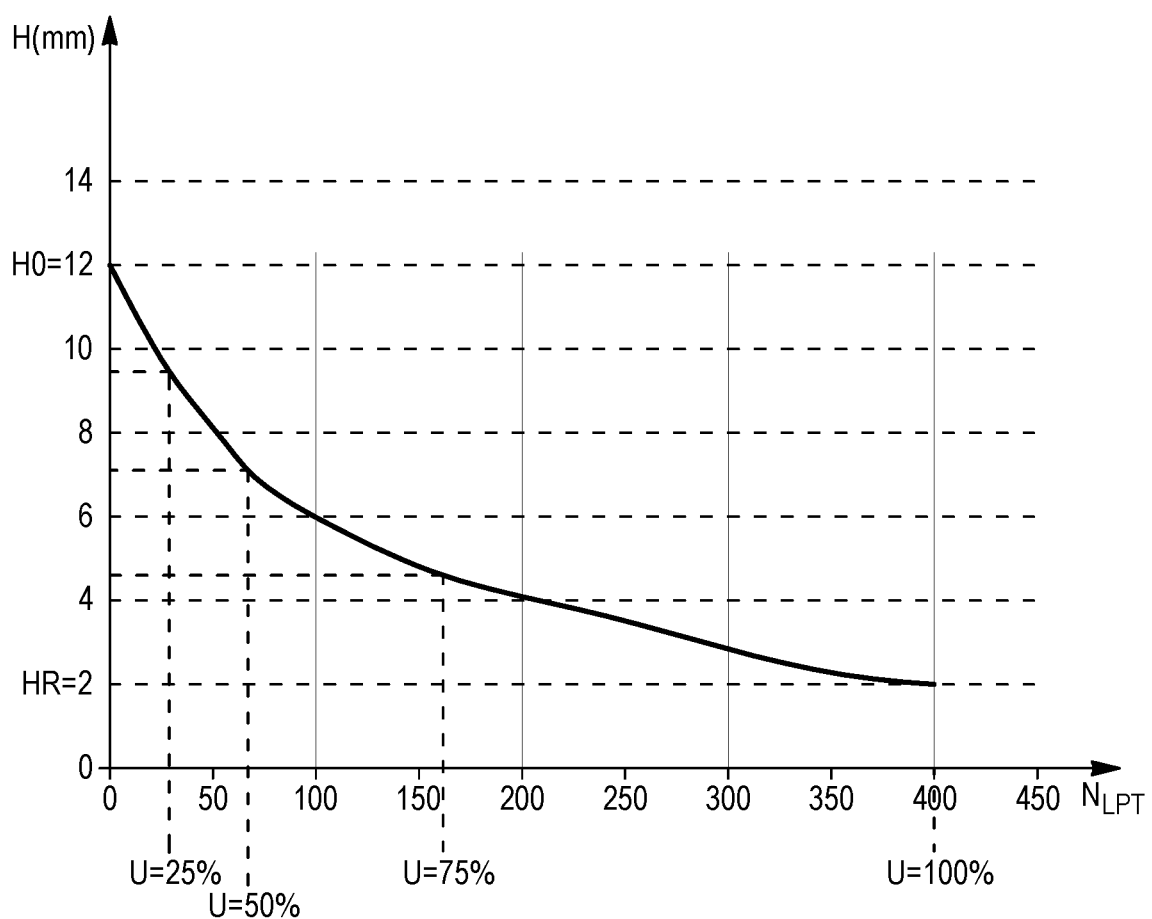
FIG. 6: variation of the height H of a circumferential ridge as a function of the number of landings performed.

Finally, FIG. 6 presents the variation of the height H of a circumferential ridge as a function of the number of landings performed $N_{LPT}$ (LPT meaning "Landings Per Tread"). In the example presented, the height H of the circumferential ridge varies from an initial value equal to 12 mm, for a new tire with zero wear ratio, when no landing has yet been performed, to an allowable remaining value HR equal to 2 mm, for a totally worn tire with a wear ratio equal to 100%, after 400 landings. The trend of the height H as a function of the number of landings performed $N_{LPT}$ is not linear. Thus, wear ratios U equal to 25%, 50% and 75% correspond respectively, in the present case, to 30, 65 and 160 landings. In practice, for a given tire, mounted on a given aeroplane, the trend curve of the height H of a given circumferential ridge as a function of the number of landings performed $N_{LPT}$, or wear curve, is determined during the first life cycle of the tire, ranging from the new tire to the totally worn tire, by virtue of the wear indicators positioned in said circumferential ridge. This wear curve thus determined, for a circumferential ridge of a given tire on a given aeroplane, can be used to predict the potential remaining wear of the tire on each observation of the tire. This makes it possible to define the moment when the replacement of the tire will be necessary and to plan the maintenance operations in order to reduce the downtime of the aeroplane. Moreover, the observation that, if appropriate, the wear of the circumferential ridge of a tire is not following this wear curve, may reveal abnormal operation of the tire, for example uneven wear, and trigger a preventive maintenance action. Similarly, the comparison of the wear curves of tires fitted on several aeroplanes of a single fleet makes it possible, in case of divergence of said wear curves, to identify the aeroplane or aeroplanes on which checks and possible adjustments should be made.

The invention has been more particularly studied in the case of an aeroplane tire of dimensions 46×17R20, intended to be fitted on the main landing gear of a liner aeroplane. For such a tire, the inflation pressure is 15.3 bar, the static load 21 tons and the maximum speed 360 km/h.

In the example studied, three circumferential ridges, including a median circumferential ridge and two shoulder circumferential ridges, each have six wear indicators that are equidistant along the circumference of the tire, that is to say distributed every 60°. Any wear indicator of a first shoulder circumferential ridge, corresponding to the outermost circumferential ridge, when the tire is mounted on the landing gear, is a pattern of 14 cylindrical cavities, composed of 10 wear cavities, including 9 positioned at the centre and one at the periphery of the pattern, and of 4 positioning cavities, positioned at the periphery of the pattern. Any wear indicator of the median circumferential ridge, axially at the centre of the tread, is a pattern of 13 cylindrical cavities, composed of 10 wear cavities, including 9 positioned at the centre and one at the periphery of the pattern, and of 3 positioning cavities, positioned at the periphery of the pattern. Any wear indicator of a second shoulder circumferential ridge, corresponding to the innermost circumferential ridge, when the tire is mounted on the landing gear, is a pattern of 15 cylindrical cavities, composed of 10 wear cavities, including 9 positioned at the centre and one at the periphery of the pattern, and of 5 positioning cavities positioned at the periphery of the pattern. For each of the three types of wear indicator previously described, in which the numbers N1 of wear cavities are all identical, the N1=10 wear cavities $C1_i$, i varying from 1 to 10, have depths $P1_i$ respectively equal to i*(H0−HR), corresponding to wear ratios varying between 10% and 100% in 10% increments. They also have circular emerging surfaces of diameter equal to 2 mm. For each of the three types of wear indicators previously described, for which the numbers of positioning cavities N2 are different from one another, N2 varying between 3 and 5, the N2 positioning cavities $C2_j$, j varying from 1 to N2, have depths $P2_j$ all equal to 1.2*(H0−HR), corresponding to a wear ratio equal to 120%. They also have circular emerging surfaces of diameter equal to 4 mm. This configuration corresponds to the wear indicators described in FIGS. 5A and 5B.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire for an aeroplane comprising a tread, adapted to come into contact with the ground via a rolling surface:
   the tread comprising at least three circumferential ridges axially separated from one another by at least one circumferential groove;
   at least one said circumferential ridge having an initial height H0, measured on the tire in the new state, and being adapted to be worn to an allowable remaining height HR;
   the at least one circumferential ridge comprising at least one wear indicator;
   the wear indicator comprising N cylindrical cavities emerging on the rolling surface and independent of one another,
   wherein the N cavities of the wear indicator are divided up into a first family of N1 wear cavities $C1_i$ having respective initial depths $P1_i$ in pairs that are distinct and equal to i*(H0−HR)/N1, i being an integer number varying from 1 to N1, and into a second family of N2 positioning cavities $C2_j$, j being an integer number varying from 1 to N2, each said positioning cavity $C2j$ having an initial depth $P2_j$ strictly greater than (H0−HR), such that only the N2 positioning cavities $C2_j$ emerge on the rolling surface when the allowable remaining height HR of the circumferential ridge is reached,
   wherein all the wear cavities $C1i$ have, on the rolling surface, an emerging surface inscribed in a circle of identical diameter D1,
   wherein all the positioning cavities $C2_j$ have, on the rolling surface, an emerging surface inscribed in a circle of identical diameter D2, and
   wherein D1≠D2.

2. The tire for an aeroplane according to claim 1, wherein the number N1 of said wear cavities $C1_i$ is at least equal to 1 and at most equal to 10.

3. The tire for an aeroplane according to claim 1, wherein the number N2 of said positioning cavities $C2_j$ is at least equal to 1 and at most equal to 5.

4. A tire for an aeroplane comprising a tread, adapted to come into contact with the ground via a rolling surface:
   the tread comprising at least three circumferential ridges axially separated from one another by at least one circumferential groove;
   at least one said circumferential ridge having an initial height H0, measured on the tire in the new state, and being adapted to be worn to an allowable remaining height HR;
   the at least one circumferential ridge comprising at least one wear indicator;
   the wear indicator comprising N cylindrical cavities emerging on the rolling surface and independent of one another,
   wherein the N cavities of the wear indicator are divided up into a first family of N1 wear cavities $C1_i$ having respective initial depths $P1_i$ that are distinct and equal to i*(H0−HR)/N1, i being an integer number varying from 1 to N1, and into a second family of N2 positioning cavities $C2_j$, j being an integer number varying from 1 to N2, each said positioning cavity $C2j$ having an initial depth $P2_j$ strictly greater than (H0−HR), such that only the N2 positioning cavities $C2_j$ emerge on the rolling surface when the allowable remaining height HR of the circumferential ridge is reached, and
   wherein the tread comprises two shoulder circumferential ridges and one median circumferential ridge, each comprising at least one wear indicator having the same number N1 of wear cavities $C1_i$ and a different number N2 of positioning cavities $C2_j$, such that the total number N=N1+N2 of cavities is different for each of the two shoulder circumferential ridges and the median circumferential ridge.

5. A tire for an aeroplane comprising a tread, adapted to come into contact with the ground via a rolling surface:
   the tread comprising at least three circumferential ridges axially separated from one another by at least one circumferential groove;
   at least one said circumferential ridge having an initial height H0, measured on the tire in the new state, and being adapted to be worn to an allowable remaining height HR;
   the at least one circumferential ridge comprising at least one wear indicator;
   the wear indicator comprising N cylindrical cavities emerging on the rolling surface and independent of one another,
   wherein the N cavities of the wear indicator are divided up into a first family of N1 wear cavities $C1_i$ having respective initial depths $P1_i$ that are distinct and equal to i*(H0−HR)/N1, i being an integer number varying from 1 to N1, and into a second family of N2 positioning cavities $C2_j$, j being an integer number varying from 1 to N2, each said positioning cavity $C2j$ having an initial depth $P2_j$ strictly greater than (H0−HR), such that only the N2 positioning cavities $C2_j$ emerge on the rolling surface when the allowable remaining height HR of the circumferential ridge is reached, and
   wherein the tread comprises two said shoulder circumferential ridges and one said median circumferential ridge, each comprising at least three wear indicators, distributed over the circumference of the circumferential ridge, identical to one another for each circumferential ridge, and having, from one circumferential ridge to the other, the same number $N1$ of wear cavities $C1_i$ and a different number $N2$ of said positioning cavities $C2_j$.

6. The tire for an aeroplane according to claim 4, wherein the respective at least one wear indicator of the two shoulder circumferential ridges and of the median circumferential ridge are positioned circumferentially relative to one another in a circumferential angular sector at most equal to 20°.

* * * * *